(12) United States Patent
Choi et al.

(10) Patent No.: US 8,107,044 B2
(45) Date of Patent: Jan. 31, 2012

(54) LIQUID CRYSTAL DISPLAY APPARATUS

(75) Inventors: Sun-Hyung Choi, Hwaseong-si (KR);
Jin-Hee Park, Seoul (KR); Jeong-Geun Yoo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 228 days.

(21) Appl. No.: 12/501,054

(22) Filed: Jul. 10, 2009

(65) Prior Publication Data

US 2010/0141887 A1 Jun. 10, 2010

(30) Foreign Application Priority Data

Dec. 4, 2008 (KR) .......................... 10-2008-0122524

(51) Int. Cl.
*G02F 1/1337* (2006.01)

(52) U.S. Cl. ........................................ 349/129; 349/130
(58) Field of Classification Search ................... 349/129
See application file for complete search history.

(56) References Cited

U.S. PATENT DOCUMENTS 7,110,075 B2 * 9/2006 Tak et al. ....................... 349/129

* cited by examiner

*Primary Examiner* — Richard Kim
(74) *Attorney, Agent, or Firm* — F. Chau & Associates, LLC (57) ABSTRACT

A liquid crystal display (LCD) apparatus includes a first substrate including a switching element and a pixel electrode, the pixel electrode electrically connected to the switching element, and a second substrate disposed over the first substrate, the second substrate including a common electrode having a first slit and a second slit, wherein the first slit divides a unit pixel area into a plurality of domains, and the second slit partially overlaps the pixel electrode and is disposed to correspond to a boundary area of adjacent unit pixel areas.

18 Claims, 13 Drawing Sheets

LIQUID CRYSTAL DISPLAY APPARATUS

CROSS-REFERENCE TO RELATED APPLICATION

This application claims priority to Korean Patent Application No. 2008-122524, filed on Dec. 4, 2008, the contents of which are incorporated herein by reference in their entirety.

BACKGROUND OF THE INVENTION

1. Technical Field

The present disclosure relates to a liquid crystal display (LCD) apparatus, and more particularly, to an LCD apparatus including an electrode having a slit therethrough.

2. Discussion of the Related Art

A liquid crystal display (LCD) apparatus includes two display plates having field generating electrodes such as a pixel electrode and a common electrode thereon. A liquid crystal layer is disposed between the two display plates. Polarizing plates are respectively disposed on the outer surfaces of the two display plates. Voltages are applied to the field generating electrodes, so that an electric field may be generated in the liquid crystal layer. Thus, an arrangement direction of liquid crystal molecules in the liquid crystal layer is determined. As such, the LCD apparatus may control light passing through the liquid crystal layer and an image may be displayed.

The LCD apparatus having a vertical alignment (VA) mode provides a large contrast ratio and a large reference side viewing angle. In the LCD apparatus having the VA mode, when the electric field is not applied to the liquid crystal layer, the longitudinal axes of the liquid crystal molecules are arranged substantially perpendicular to the display plates.

The VA mode includes a patterned vertical alignment (PVA) mode and a multi-domain vertical alignment (MVA) mode. To increase a side viewing angle, a slit can be formed on the field generating electrodes in the PVA mode or a protrusion can be formed on the field generating electrodes in the MVA mode. The slit and the protrusion determine the inclination direction of the liquid crystal molecules. Thus, the reference side viewing angle may be increased by disposing the slit and the protrusion in various configurations.

However, the slit and the protrusion decrease the transmittance of the LCD apparatus, and the liquid crystal molecules in a boundary area between the pixel electrodes are difficult to control. As such, the aperture ratio of a unit pixel area may be decreased. For example, in a normally black mode of the PVA mode, adjacent domains simultaneously affect the liquid crystal molecules disposed near the boundary area of the adjacent domains. As such, textures may be generated near the boundary area due to unstable liquid crystal molecules.

The textures cause optical defects such as stains and afterimages in a display screen. A response time may increase due to the textures. When the width of a light-blocking part is increased to cover the textures, the aperture ratio is decreased.

SUMMARY OF THE INVENTION

According to an exemplary embodiment of the present invention, a liquid crystal display (LCD) apparatus comprises an array substrate including a first substrate, a signal line formed on the first substrate, a switching element connected to the signal line, and a pixel electrode connected to the switching element, a counter substrate including a second substrate disposed over the array substrate, the counter substrate including a common electrode formed on the second substrate, wherein the common electrode includes a domain division slit dividing a unit pixel area into a plurality of domains, and includes a transmittance improvement slit partially overlapping the pixel electrode and corresponding to a boundary area of adjacent unit pixel areas, and a liquid crystal layer disposed between the array substrate and the counter substrate.

The counter substrate may further comprise a light-blocking part overlapping the boundary area and the switching element.

An edge of the light-blocking part can be disposed between a first edge of the transmittance improvement slit overlapping the pixel electrode and an edge of the pixel electrode defining the boundary area.

When an electric field is applied to the liquid crystal layer, an arrangement direction of liquid crystal molecules adjacent to the first edge and an arrangement direction of liquid crystal molecules disposed between the first edge and the edge of the pixel electrode can be different from each other.

The first edge and the edge of the pixel electrode can be formed substantially parallel with each other.

The length of the transmittance improvement slit can be shorter than the width of the unit pixel area.

A second edge of the transmittance improvement slit can face the first edge and can be disposed in the boundary area.

A distance between the second edge and the edge of the pixel electrode can be no less than two times and no more than three times a distance between the array substrate and the counter substrate.

The domain division slit can be integrally formed with the transmittance improvement slit.

The domain division slit may extend along an imaginary central line of the unit pixel area substantially parallel with a first direction, and the transmittance improvement slit may extend along a second direction substantially perpendicular to the first direction.

The domain division slit and the transmittance improvement slit can be connected to each other in a T-shape.

The signal line may comprises a gate line disposed under the domain division slit, extending along the first direction, and connected to a gate electrode of the switching element, and a data line extending along the second direction and overlapping the transmittance improvement slit in the boundary area, the data line connected to a source electrode of the switching element.

A width of the light-blocking part is larger than a width of the boundary area.

The pixel electrode in a first unit pixel area can be connected to a drain electrode of the switching element in a second unit pixel area adjacent to the first unit pixel area.

The pixel electrode can be driven by a previous gate driving method.

Embossed notches or engraved notches can be formed on the edges of the domain division slit facing each other.

According to an exemplary embodiment of the present invention, a liquid crystal display (LCD) apparatus comprises a first substrate including a switching element and a pixel electrode, the pixel electrode electrically connected to the switching element, and a second substrate disposed over the first substrate, the second substrate including a common electrode having a first slit and a second slit, wherein the first slit divides a unit pixel area into a plurality of domains, and the second slit partially overlaps the pixel electrode and is disposed to correspond to a boundary area of adjacent unit pixel areas.

A length of the second slit can be shorter than a width of the unit pixel area.

The first slit can be integrally formed with the second slit.

The first slit and the second slit can be connected to each other in a T-shape.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present.

Figure 1A:
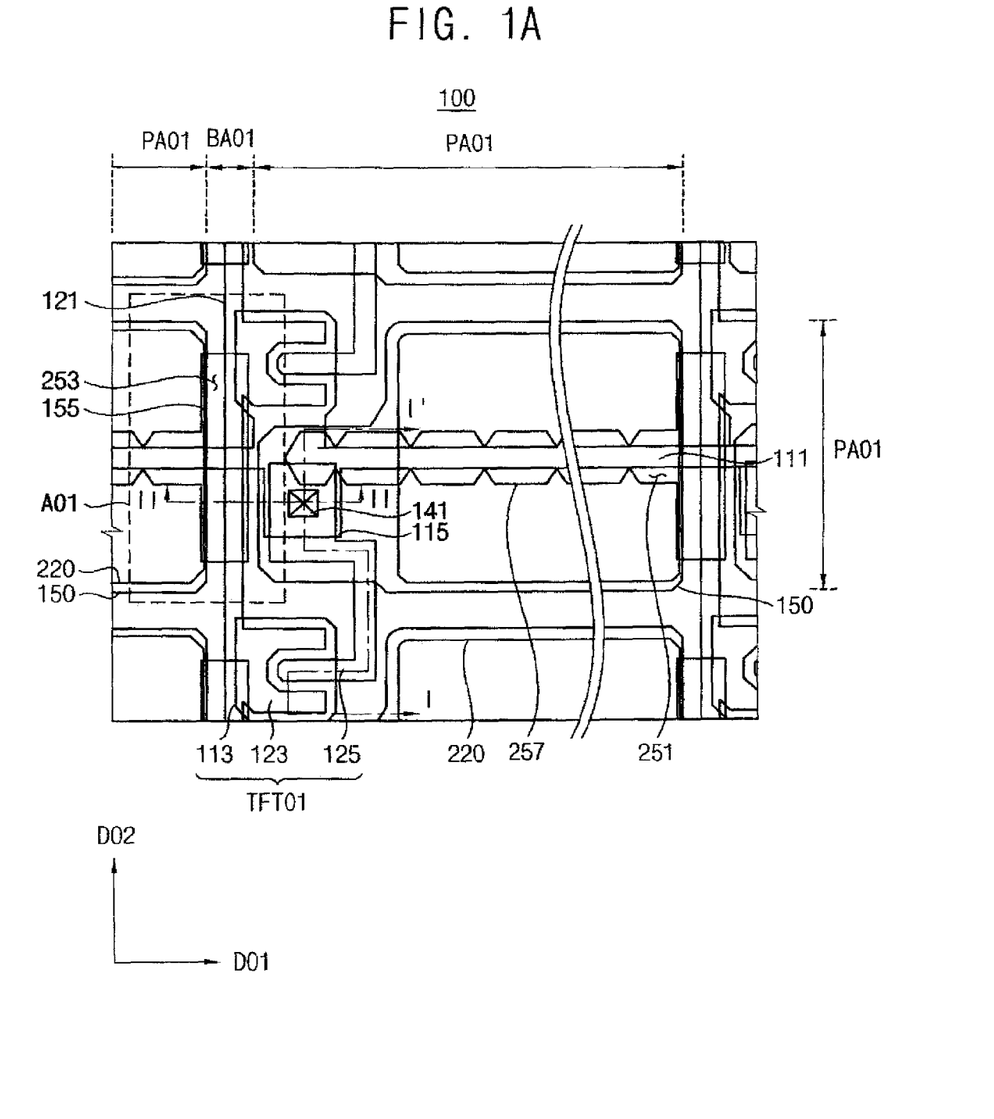
FIG. 1A is a plan view illustrating a unit pixel area of a liquid crystal display (LCD) apparatus according to an exemplary embodiment of the present invention.
Figure 1B:
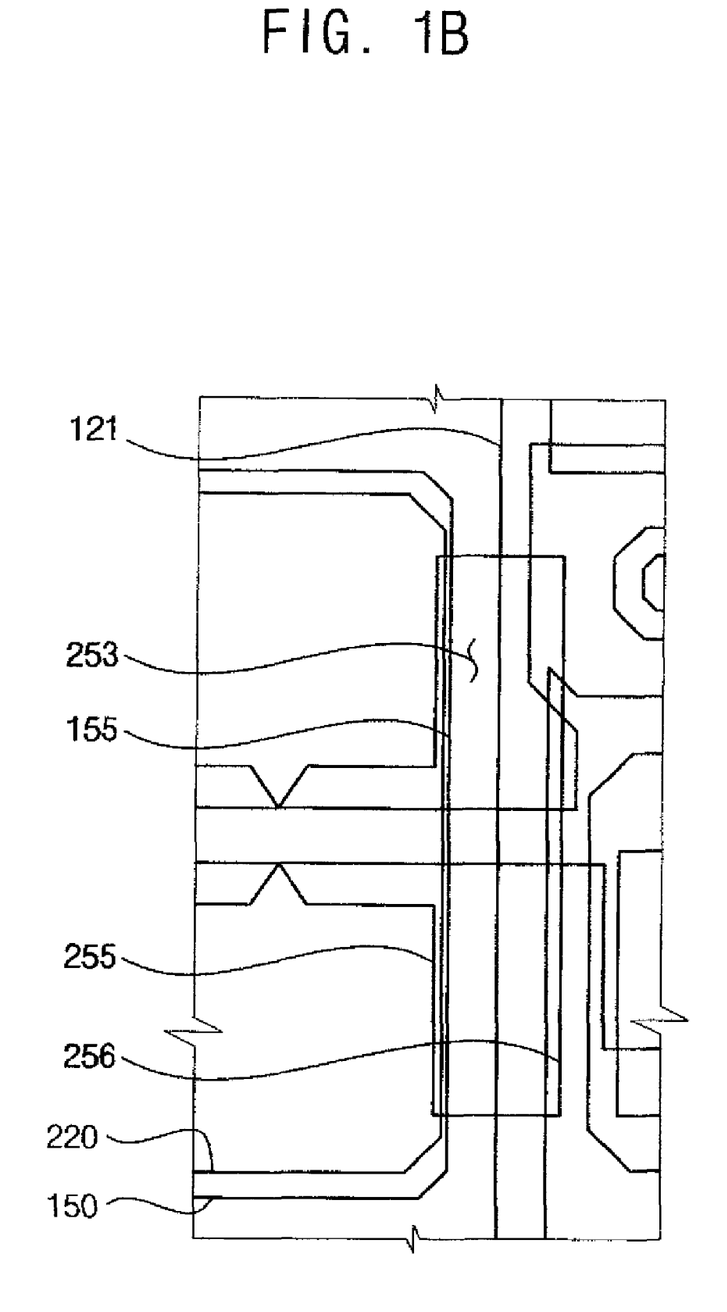
FIG. 1B is an enlarged plan view of portion A01 in FIG. 1A according to an exemplary embodiment of the present invention.
Figure 2:
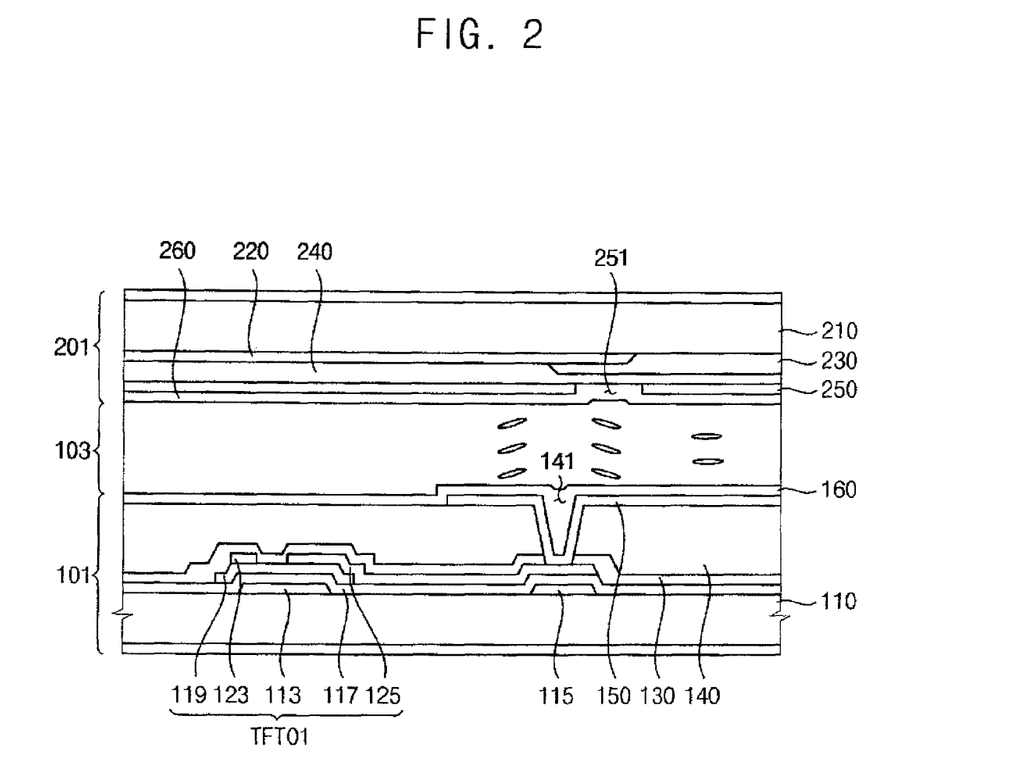
FIG. 2 is a cross-sectional view taken along the line I-I' in FIG. 1A according to an exemplary embodiment of the present invention.

FIG. 1A is a plan view illustrating a unit pixel area of a liquid crystal display (LCD) apparatus according to an exemplary embodiment of the present invention. FIG. 1B is an enlarged plan view showing portion A01 in FIG. 1A according to an exemplary embodiment of the present invention. FIG. 2 is a cross-sectional view taken along the line I-I' in FIG. 1A according to an exemplary embodiment of the present invention.

Referring to FIGS. 1A, 1B and 2, the LCD apparatus 100 includes an array substrate 101, a counter substrate 201 and a liquid crystal layer 103.

The array substrate 101 and the counter substrate 201 face each other and are attached to each other by sealing members having, for example, a frame shape. Liquid crystal can be injected into a space formed by the array substrate 101, the counter substrate 201 and the sealing members, to form the liquid crystal layer 103. The counter substrate 201 may be a color filter substrate. The array substrate 101 may be an active matrix substrate having thin-film transistors (TFTs).

The array substrate 101 may have a substantially rectangular shape. Thus, a first direction D01 is substantially parallel with a transverse direction or a horizontal direction of the array substrate 101. A second direction D02 is substantially parallel with a longitudinal direction or a vertical direction of the array substrate 101, so that the second direction D02 may be substantially perpendicular to the first direction D01.

In an exemplary embodiment, a unit pixel area PA01 of the array substrate 101 may have a rectangular shape. Referring to FIG. 1A, a first side of the unit pixel area PA01 along the first direction D01 is longer than a second side of the unit pixel area PA02 along the second direction D02. When a side of a pixel along the first direction D01 is longer than a side of the pixel along the second direction D02 and silts are formed through a common electrode of the counter substrate 201, the pixel may be referred to as a landscape patterned vertical alignment (PVA) mode pixel. The landscape PVA mode pixel may be applied to a display apparatus having a wide screen, such as a Global Positioning System (GPS) navigation device.

Figure 3A:
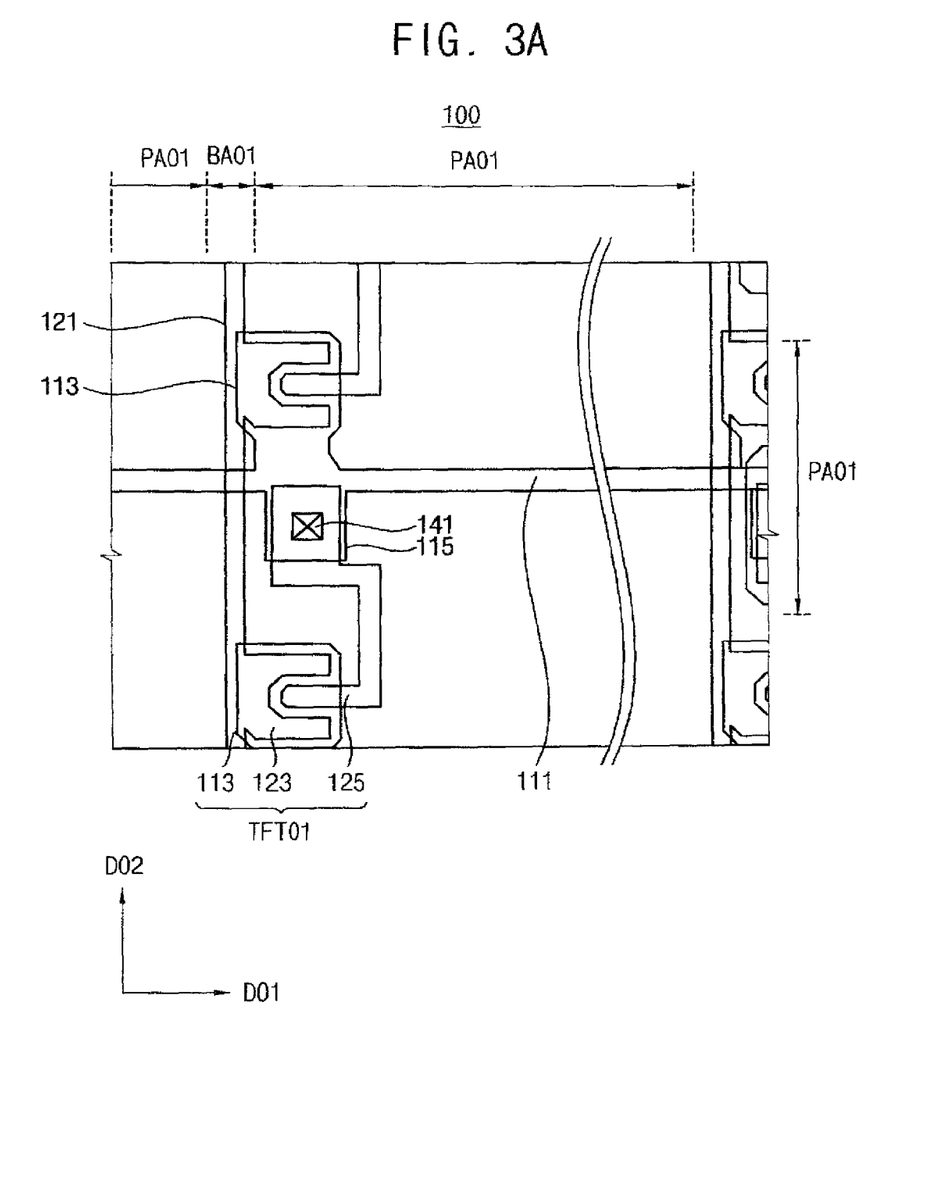
FIGS. 3A and 3B are plan views illustrating a method of forming an LCD apparatus according to an exemplary embodiment of the present invention.
Figure 3B:
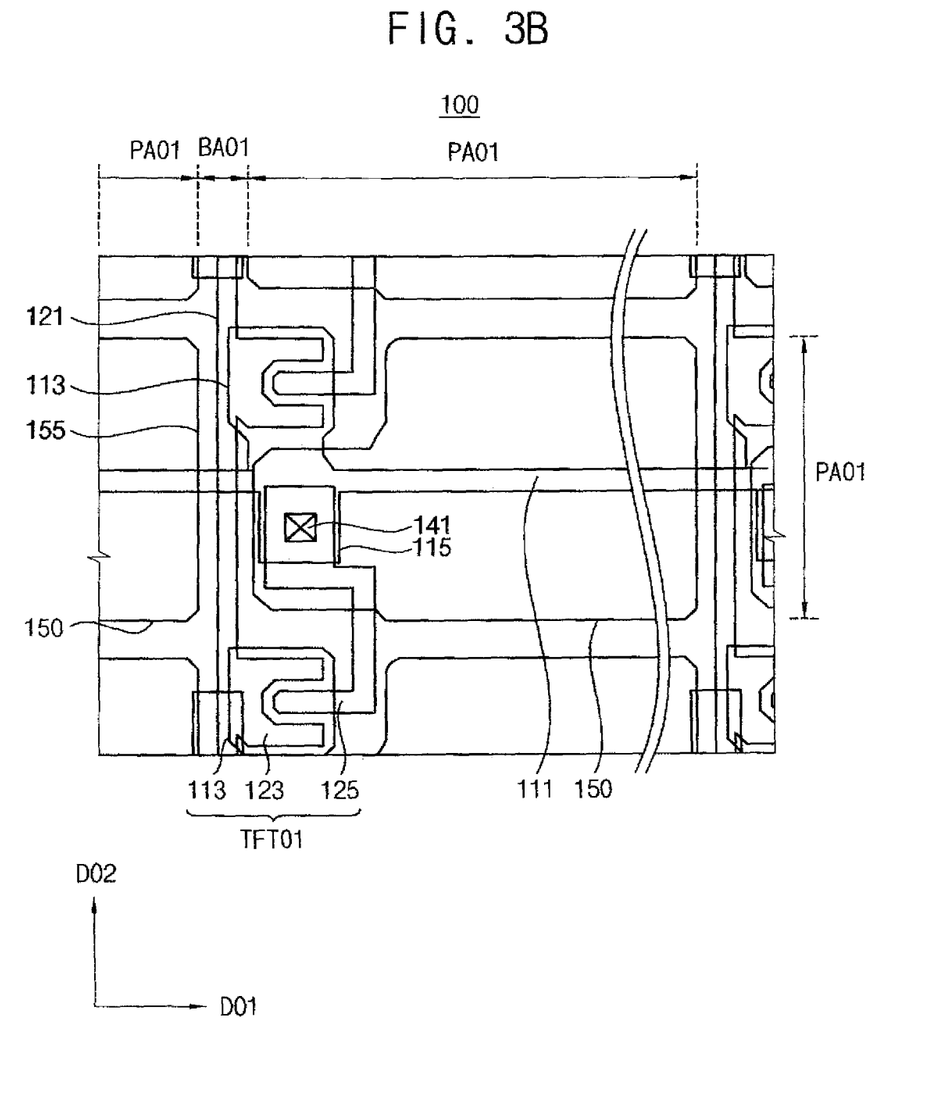

FIGS. 3A and 3B are plan views illustrating a method of forming an LCD apparatus according to an exemplary embodiment of the present invention.

Referring to FIGS. 2 and 3A, the array substrate 101 may include a lower substrate 110, signal lines, a switching element TFT01 and a pixel electrode 150.

In an exemplary embodiment, a gate metal layer is formed on the lower substrate 110. The lower substrate 110 may comprise, for example, glass or plastic via a sputtering process. The gate metal layer is patterned via a photolithography process, so that a plurality of gate lines 111 extending along the first direction D01 and a plurality of gate electrodes 113 are formed. Each of the gate lines 111 extends along an imaginary central line of the unit pixel area PA01. The gate electrode 113 protrudes from the gate line 111 along the first direction D01 of the gate line 111. A storage electrode 115 protrudes from the gate line 111 opposite to the gate electrode 113. A pixel electrode 150 is disposed in the unit pixel area PA01. The unit pixel area PA01 is an individual area unit in which the liquid crystal layer 103 is independently controlled.

A gate insulation layer 117 is formed on the gate line 111. The gate insulation layer 117 may comprise insulation material such as, for example, silicon nitride or silicon oxide. An impure amorphous silicon layer and a pure amorphous silicon layer are formed on the gate insulation layer 117. The impure amorphous silicon layer and the pure amorphous silicon layer are patterned via the photolithography process, so that a channel layer 119 is formed. The channel layer 119 is formed on the gate insulating layer 117 corresponding to the gate electrode 113.

Then, source metal layers are formed on the gate insulation layer 117 and are patterned, so that a plurality of data lines 121 extending along the second direction D02, a plurality of source electrodes 123 respectively extending from the data lines 121, and drain electrode 125 may be formed. The data lines 121 are formed in boundary areas BA01. The boundary areas BA01 are positioned between the unit pixel areas PA01 adjacent to each other, and can extend along the second direction D02.

A first end portion of the drain electrode 125 may be disposed on the channel layer 119 and may face the source electrode 123 in a first unit pixel area PA01. The drain electrode 125 extends toward a second unit pixel area PA01 adjacent to the first unit pixel area PA01 along the second direction D02. As such, a second end portion of the drain electrode 125 opposite to the first end portion may be disposed to correspond to the storage electrode 115 in the second unit pixel area PA01.

Then, the impure amorphous silicon layer of the channel layer 119 is partially removed to partially expose the pure amorphous silicon layer. Oxygen plasma treatments may be performed for stabilizing a surface of the exposed pure amorphous silicon layer according to an exemplary embodiment of the present invention.

The switching element TFT01 is formed adjacent to the boundary area BA01. The switching element TFT01 may include the gate electrode 113, the channel layer 119, the source electrode 123 and the drain electrode 125. When gate control signals are applied to the gate electrode 113 through the gate line 111, data signals applied to the source electrode 123 through the data line 121 are applied to the drain electrode 125.

Then, a passivation layer 130 is formed on the lower substrate 110 on which the data line 121 is formed. An organic insulation layer 140 is formed on the passivation layer 130. A contact hole 141 is formed through the organic insulation layer 140 and the passivation layer 130 to partially expose the drain electrode 125.

Then, referring to FIGS. 2 and 3B, conductive transparent material such as, for example, indium tin oxide (ITO) or indium zinc oxide (IZO) may be formed on the organic insulation layer 140 to form a conductive transparent material layer. The conductive transparent material layer is patterned via the photolithography process, so that the pixel electrode 150 is formed in the unit pixel area PA01. The pixel electrode 150 is connected to the drain electrode 125 through the contact hole 141. The pixel electrode 150 is not formed on the switching element TFT01. The pixel electrode 150 in the first unit pixel area PA01 may be electrically connected to the drain electrode 125 in the second unit pixel area PA01 adjacent to the first unit pixel area PA01, so that the pixel may be controlled by a previous gate method.

Referring to FIG. 2, a lower alignment layer 160 may be formed on the lower substrate 110 on which the pixel electrode 150 is formed. The lower alignment layer 160 may initially align the liquid crystal layer 103.

Figure 4:
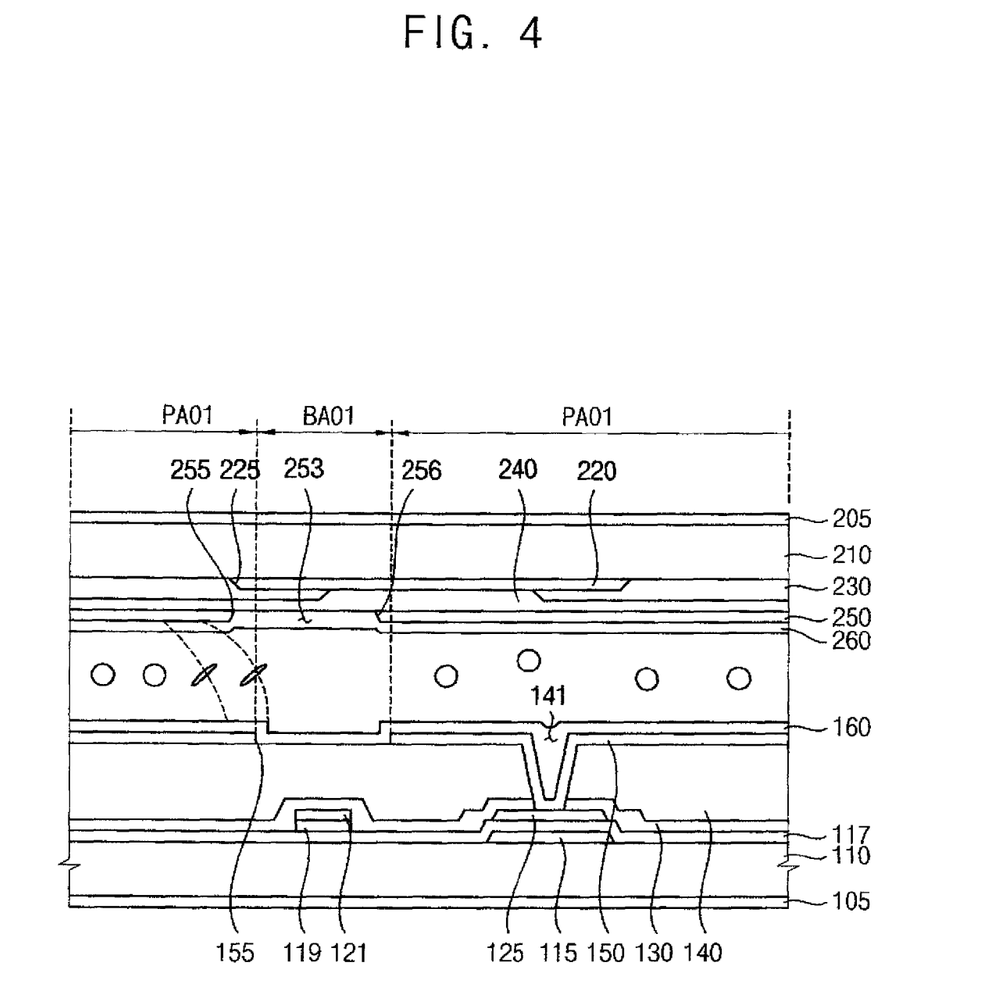
FIG. 4 is a cross-sectional view taken along the line II-II' in FIG. 1A according to an exemplary embodiment of the present invention.

FIG. 4 is a cross-sectional view taken along the line II-II' in FIG. 1A according to an exemplary embodiment of the present invention.

Referring to FIGS. 2 and 4, the counter substrate 201 may include an upper substrate 210, a light-blocking part 220, a color filter 230, an overcoat layer 240, a common electrode 250 and an upper alignment layer 260.

The upper substrate 210 faces the lower substrate 110 and may include substantially the same material as the lower substrate 110, such as, for example, glass or plastic.

Referring to FIGS. 1A and 4, the light-blocking part 220 is formed on the upper substrate 210 corresponding to the switching element TFT01, the gate lines 111 and the data lines 121. The light-blocking part 220 may comprise metallic material such as, for example, including chromium (Cr) or organic material. The width of the light-blocking part 220 may be larger than that of the gate line 111 and that of the data line 121, so that the light-blocking part 220 may cover the boundary area BA01.

The color filter 230 is formed on the upper substrate 210 and is partially exposed by the light-blocking part 220. The color filter 230 may include one of red, green and blue color filters.

The overcoat layer 240 is formed on the color filters 230 and the light-blocking part 220 for planarization. Then, the conductive transparent material such as ITO or IZO may be formed on the overcoat layer 240 to form the conductive transparent material layer. The conductive transparent material layer is patterned via the photolithography process so that the common electrode 250 is formed. A domain division slit 251 and a transmittance improvement slit 253 are formed through the common electrode 250 via the photolithography process. The upper alignment layer 260 is formed on the common electrode 250.

The domain division slit 251 is disposed over the gate line 111 and extends along the second direction D02. The domain division slit 251 divides the unit pixel area PA01 into an upper domain and a lower domain. Embossed notches and engraved notches may be formed on the edges 257 of the domain division slit 251 facing each other.

The transmittance improvement slit 253 corresponds to the boundary area BA01 and extends along the second direction D02. In an exemplary embodiment, the transmittance improvement slit 253 may completely overlap the data line 121, and may partially overlap the pixel electrode 150. The transmittance improvement slit 253 is shorter than the unit pixel area PA01 along the second direction D02. Thus, the domain division slit 251 and the transmittance improvement slit 253 are connected to each other as, for example, a T-shape.

A first edge 255 is an edge of the transmittance improvement slit 253 overlapping the pixel electrode 150. A second edge 256 is defined as an edge of the transmittance improvement slit 253 facing the first edge 255 and disposed in the boundary area BA01.

Referring to FIGS. 1A and 1B, the first edge 255 and an edge 155 of the pixel electrode 150 adjacent to the first edge 255 are parallel with each other. Referring to FIG. 4, the edge 155 of the pixel electrode 150 is closer to the data line 121 than the first edge 255. Thus, a fringe field can be formed adjacent to the boundary area BA01. For example, the fringe field may be bent from the edge 155 of the pixel electrode 150 toward the first edge 255 of the transmittance improvement slit 253.

A distance between the second edge 256 and the edge 155 of the pixel electrode 150 may be no less than two times and no more than three times a distance between the array substrate and the counter substrate 201 according to an exemplary embodiment of the present invention. As such, the fringe field may be sufficiently bent.

Figure 5:
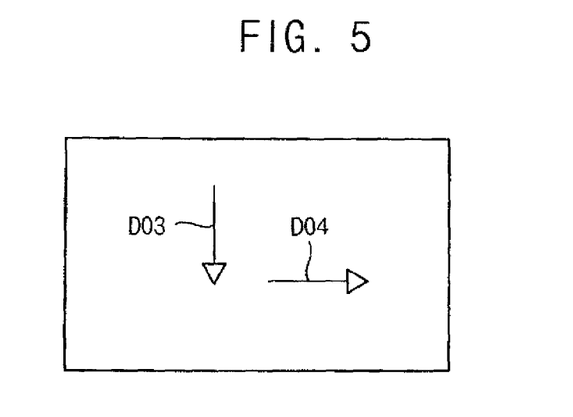
FIG. 5 is a diagram illustrating arrangement directions of liquid crystal molecules in a boundary area in FIG. 4 according to an exemplary embodiment of the present invention.

FIG. 5 is a diagram illustrating arrangement directions of liquid crystal molecules in a boundary area in FIG. 4 according to an exemplary embodiment of the present invention.

Referring to FIGS. 1A, 1B, 4 and 5, when an electric field is not applied to the liquid crystal layer 103, an arrangement direction of the liquid crystal molecules may be substantially perpendicular to the array substrate 101. When the electric field is applied to the liquid crystal layer 103 by the pixel electrode 150 and the common electrode 250, the arrangement direction of the liquid crystal molecules may be substantially parallel with the array substrate 101.

The liquid crystal molecules disposed adjacent to the first edge 255 and disposed opposite to the edge 155 of the pixel electrode 150 with respect to the first edge 255 may be arranged along a first alignment direction D03. The first alignment direction D03 may be substantially perpendicular to the edges 257 of the domain division slit 251. The liquid crystal molecules disposed between the first edge 255 and the edge 155 of the pixel electrode 150 may be arranged along a second alignment direction D04 due to the fringe field. The second alignment direction D04 may cross the first direction D01, and may be substantially perpendicular to the first direction D01.

Thus, in the unit pixel area PA01 adjacent to the boundary area BA01, a head portion of the liquid crystal aligned along the first alignment direction D03 may follow a tail portion of the liquid crystal aligned along the second direction D02. For example, the liquid crystal molecules aligned along the first and the second alignment directions D03 and D04 may not collide with each other, and are continuously distributed between the first and the second alignment directions D03 and D04. As such, the liquid crystal molecules adjacent to the boundary area BA01 are controlled. Thus, in the unit pixel area PA01 adjacent to the boundary area BA01, textures due to the liquid crystal molecules may be decreased, so that the light-blocking part 220 corresponding to the unit pixel area PA01 adjacent to the boundary area BA01 may be partially removed. As a result, the width of the light-blocking part 220 may be decreased, so that the transmittance of the LCD apparatus 100 may be increased.

The light-blocking part 220 has the width larger than that of the boundary area BA01. Referring to FIGS. 1B and 4, an edge of the light-blocking part 220 may be disposed substantially close to the first edge 255 or may be disposed between the first edge 255 and the edge 155 of the pixel electrode 150.

Figure 6:
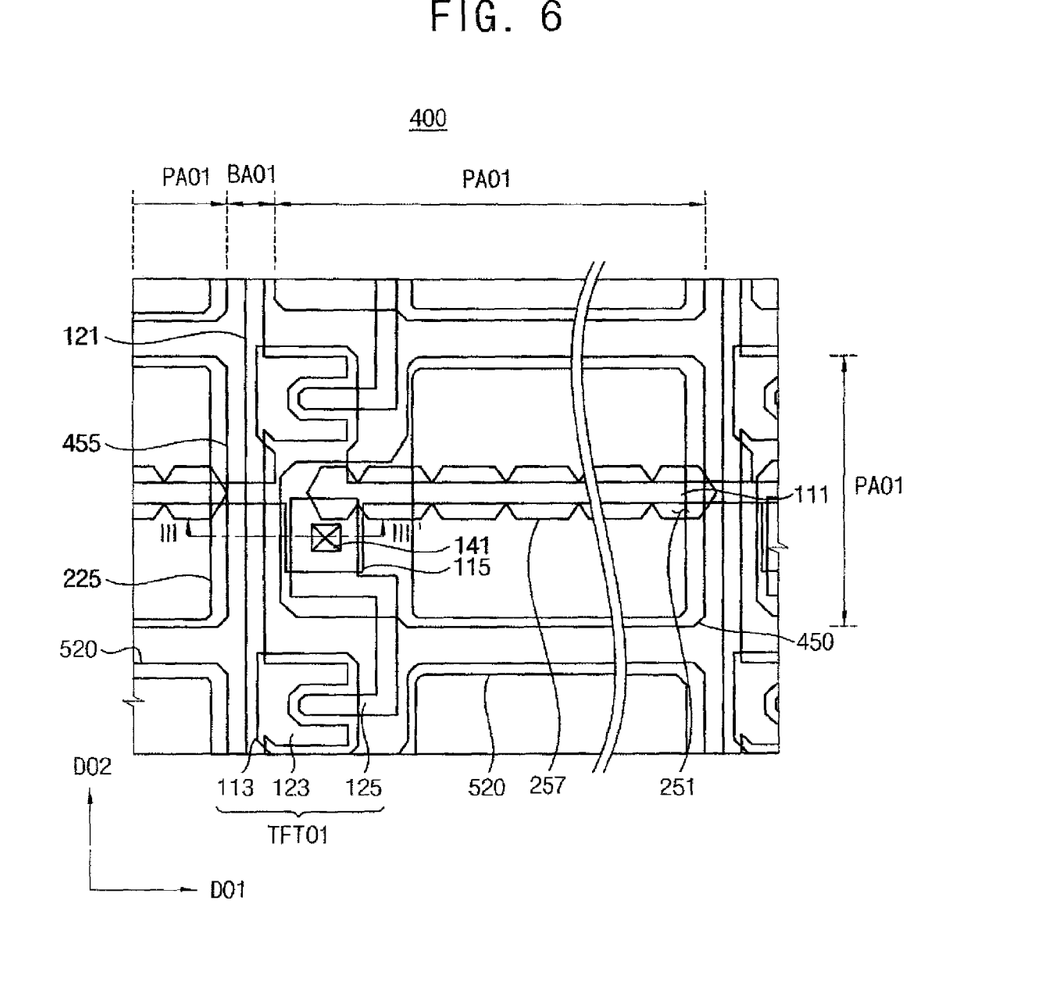
FIG. 6 is a plan view illustrating a unit pixel area of an LCD apparatus without a transmittance improvement slit.
Figure 7:
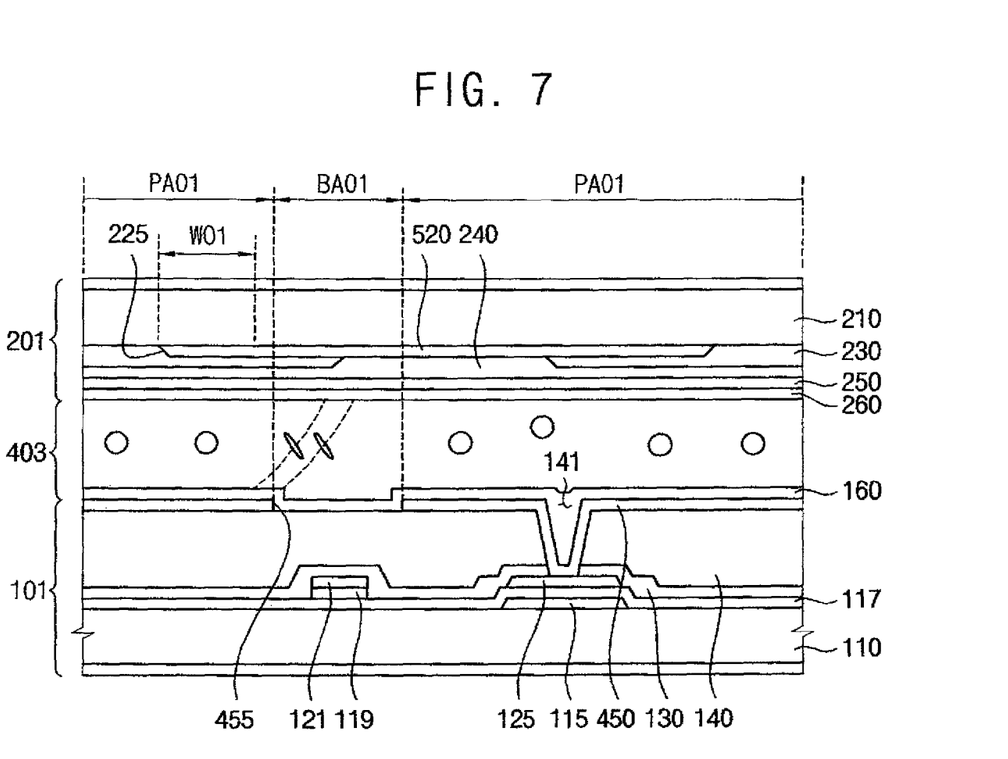
FIG. 7 is a cross-sectional view taken along the line III-III' in FIG. 6.
Figure 8:
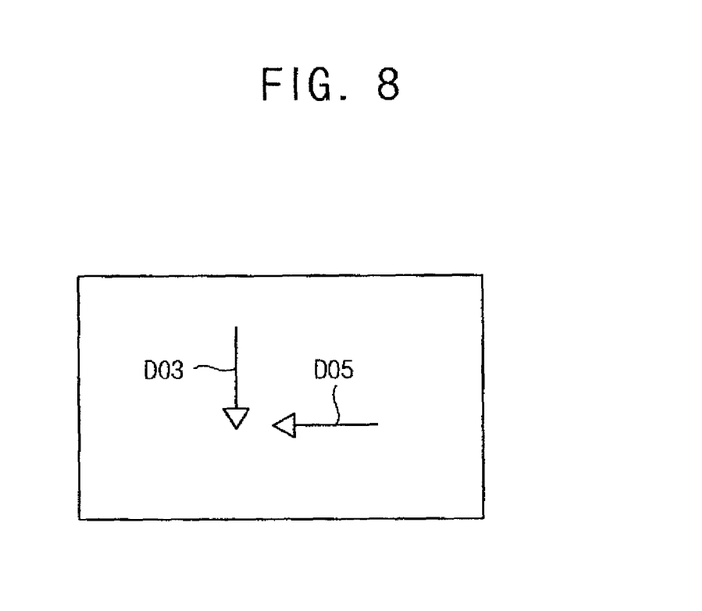
FIG. 8 is a diagram illustrating arrangement directions of liquid crystal molecules in a boundary area in FIG. 6.

FIG. 6 is a plan view illustrating a unit pixel area of an LCD apparatus without a transmittance improvement slit. FIG. 7 is a cross-sectional view taken along the line III-III' in FIG. 6. FIG. 8 is a diagram illustrating arrangement directions of liquid crystal molecules in a boundary area in FIG. 6.

Referring to FIGS. 6 and 7, the LCD apparatus 400 is substantially the same as the LCD apparatus 100 except for the transmittance improvement slit 253 removed from a common electrode 550 in FIG. 6. The LCD apparatus 400 does not include the transmittance improvement slit 253, so that a fringe field may be bent from an edge 455 of a pixel electrode 450 to the common electrode 550 toward the outside of the unit pixel area PA01.

Referring to FIGS. 7 and 8, when the electric field is applied to a liquid crystal layer 403, the arrangement direction of the liquid crystal molecules adjacent to the boundary area BA01 may be changed. The liquid crystal molecules in the unit pixel area PA01 adjacent to the edge 455 of the pixel electrode 450 may be arranged along the first alignment direction D03. The liquid crystal molecules in the fringe field may be arranged along a third alignment direction D05. The third alignment direction D05 may be opposite to the second alignment direction D04.

Referring to FIG. 8, the head portion of the liquid crystal molecules along the first alignment direction and the head portions of the liquid crystal molecules along the third alignment direction may collide with each other. Thus, the textures may be generated adjacent to the edge 455 of the pixel electrode 450. Therefore, the liquid crystal molecules adjacent to the edge 455 of the pixel electrode 450 or adjacent to the boundary area BA01 may not be effectively controlled. Thus, a light-blocking part 520 overlaps the pixel electrode 450 by a first width W01 to eliminate the textures. However, due to the extended light-blocking part 520, the light transmittance of the LCD apparatus 400 may be decreased.

According to an exemplary embodiment, the liquid crystal molecules adjacent to the boundary area BA01 may be effectively controlled due to the transmittance improvement slit 253. Thus, the light-blocking part 220 of the LCD apparatus 100 described in connection with FIGS. 1 to 4 may have the width smaller that that of the LCD apparatus 400 described in connection with FIGS. 6 to 8. When the transmittance improvement slit 253 is formed according to an exemplary embodiment of the present invention, textures due to the liquid crystal molecules may be decreased. As such, the light transmittance of the LCD may be increased. According to an exemplary embodiment, the light-blocking part 220 may be partially removed corresponding to the unit pixel area PA01 adjacent to the boundary area BA01. As a result, the width of the light-blocking part 220 may be decreased by the first width W01, so that the transmittance of the LCD apparatus 100 may be increased. Thus, the textures may be decreased in the area adjacent to the boundary area BA01, so that the response time of the liquid crystal layer 103 may be decreased.

Figure 9:
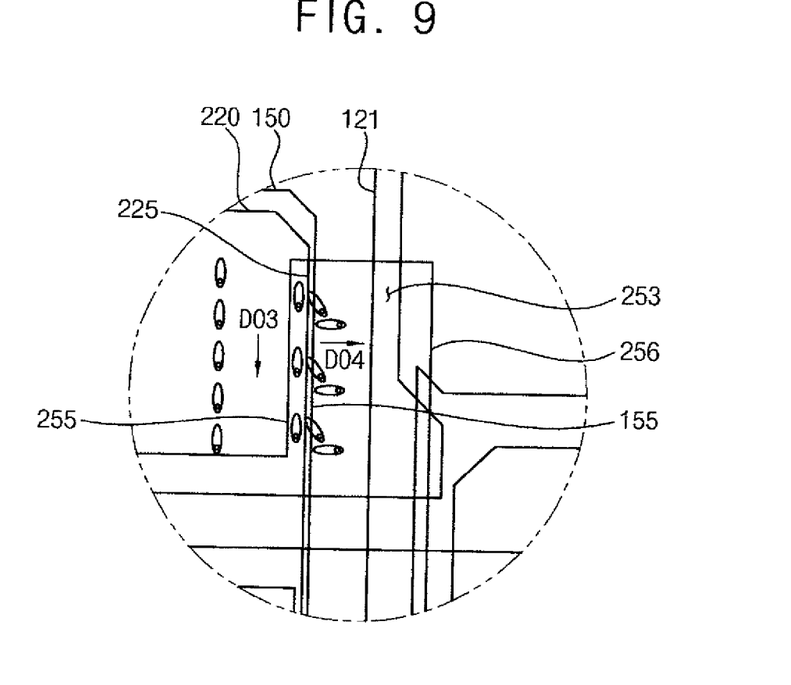
FIG. 9 shows a unit pixel area of an LCD apparatus described in connection with FIGS. 1A to 5.
Figure 10:
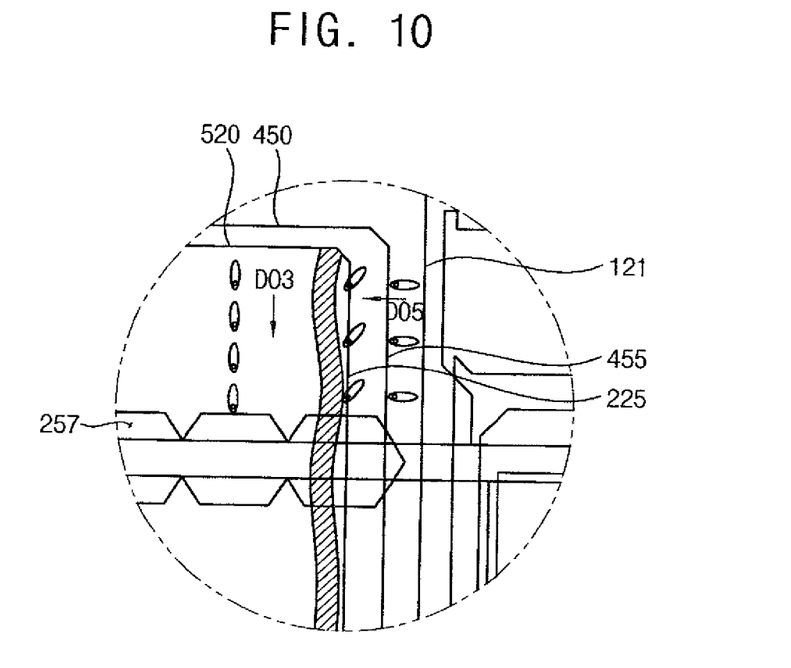
FIG. 10 shows a unit pixel area of an LCD apparatus described in connection with FIGS. 6 to 8.

FIG. 9 shows a unit pixel area of an LCD apparatus described in connection with FIGS. 1A to 5 according to an exemplary embodiment of the present invention. FIG. 10 shows the unit pixel area of an LCD apparatus described in connection with FIGS. 6 to 8.

Referring to FIG. 9, the liquid crystal molecules adjacent to the boundary area BA01 are continuously arranged between the first and the second alignment directions D03 and D04. As such, the liquid crystal molecules may not collide with each other. Thus, profiles of the unit pixel area PA01 may be substantially clear and the generation of the textures is substantially minimized in the unit pixel area PA01 adjacent to the boundary area BA01.

Referring to FIG. 10, the liquid crystal molecules adjacent to the boundary area BA01 may collide with each other. Thus, in the LCD apparatus 400, the profiles of the unit pixel area PA01 may be unclear and the textures may be generated in the unit pixel area PA01 adjacent to the boundary area BA01. For example, the textures may be considerably generated in the right and the left side areas of the unit pixel area PA01.

Compared to the LCD apparatus 100 described in connection with FIGS. 1A to 5 and the LCD apparatus 400 described in connection with FIGS. 6 to 8 with respect to an aperture ratio and light transmittance, the LCD apparatus 100 according to an exemplary embodiment has better display quality than the LCD apparatus 400 illustrated in FIGS. 6 to 8. For example, the unit pixel area PA01 in FIG. 10 has an aperture ratio of about 52.7%. The unit pixel area PA01 in FIG. 9 has an aperture ratio of about 57.2%. Thus, the aperture ratio is increased by about 4.5%. The unit pixel area PA01 in FIG. 10 has a transmittance of about 5.43%. The unit pixel area PA01 in FIG. 9 has a transmittance of about 5.76%. Thus, the transmittance is increased by about 0.33%.

FIGS. 11A, 11B, 11C and 11D are voltage-time graphs obtained from an LCD apparatus described in connection with FIGS. 1A to 5. In FIGS. 11A to 11D, a horizontal axis indicates test times and a vertical axis indicates voltages reduced from the luminance of a display area of the LCD apparatus 100.

The voltage-time graphs in FIGS. 11A to 11D show test results for the LCD apparatus 100 using voltage-time test equipment such as a BM7 apparatus. The BM7 apparatus can be used to test the hysteresis and slow response of a displayed image in the display area.

Figure 11A:
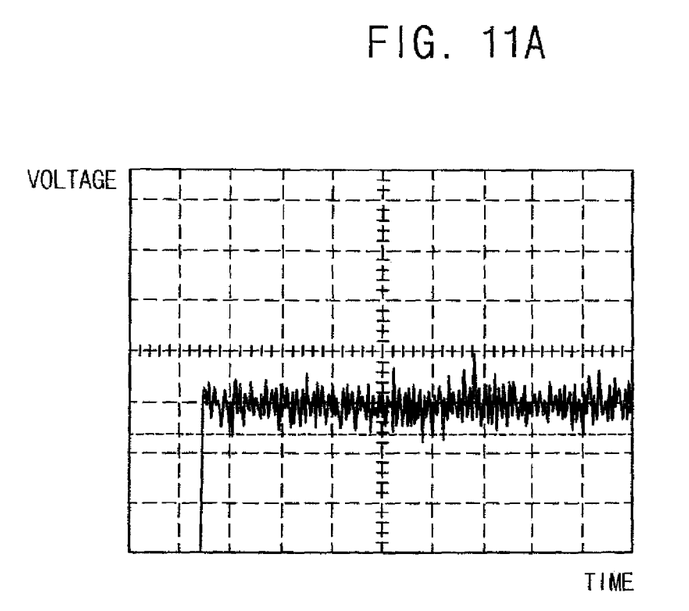
FIGS. 11A, 11B, 11C and 11D are voltage-time graphs obtained from an LCD apparatus described in connection with FIGS. 1A to 5.
Figure 11B:
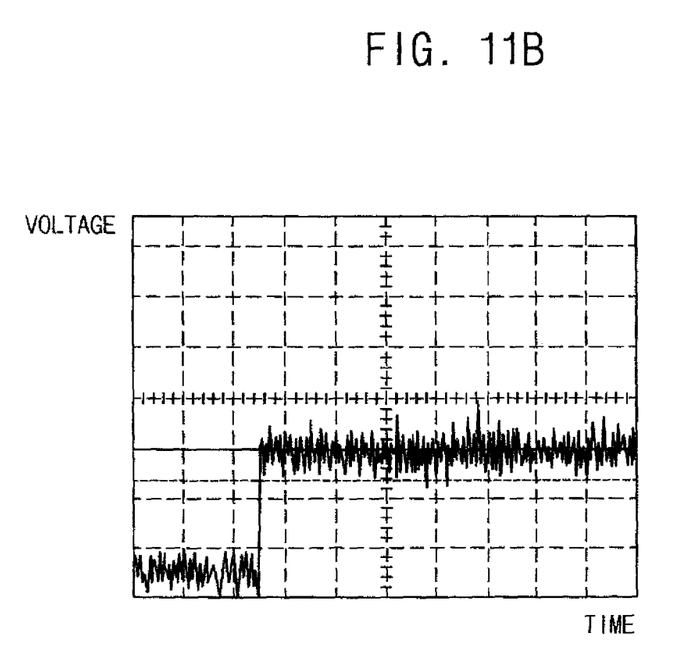
Figure 11C:
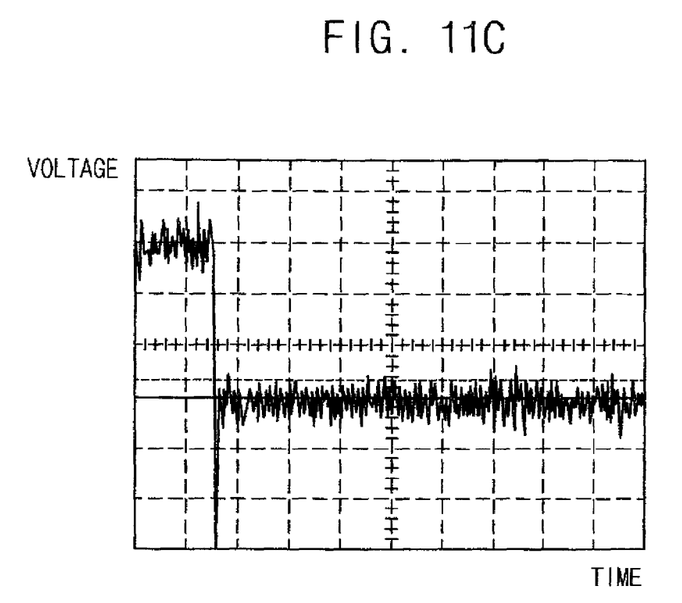
Figure 11D:
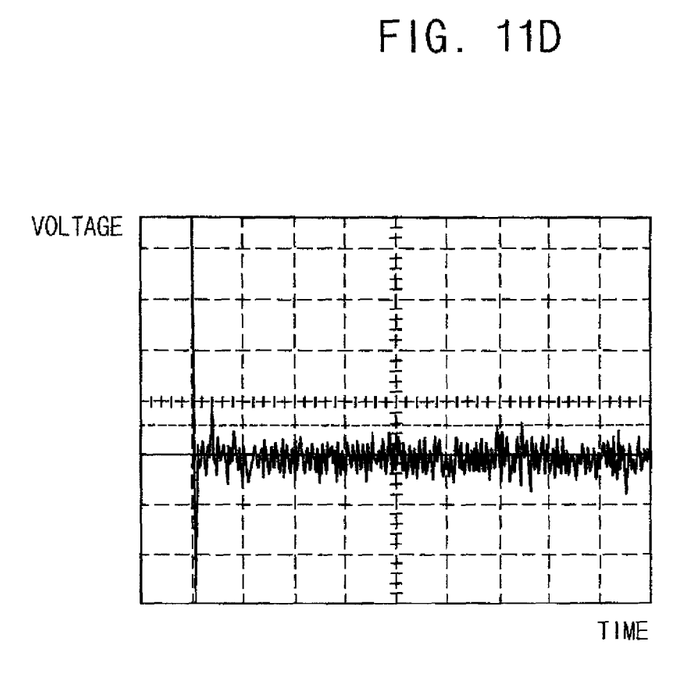

FIG. 11A indicates a voltage-time relationship when the grayscale of the displayed image is changed from gray level 0 to gray level 31. FIG. 11B indicates a voltage-time relationship when the grayscale of the displayed image is changed from gray level 15 to gray level 31. FIG. 11C indicates a voltage-time relationship when the grayscale of the displayed image is changed from gray level 47 to gray level 31. FIG. 11D indicates a voltage-time relationship when the grayscale of the displayed image is changed from gray level 63 to gray level 31.

Referring to the voltage-time graphs in FIGS. 11A to 11D, in the LCD apparatus 100, voltage levels are instantly changed when the grayscale is increased or decreased. Thus, no considerable delay along a time axis occurs during the period between luminances corresponding to different grayscales, and the voltage levels are instantly changed.

FIGS. 12A, 12B, 12C and 12D are voltage-time graphs obtained from an LCD apparatus described in connection with FIGS. 6 to 8.

Figure 12A:
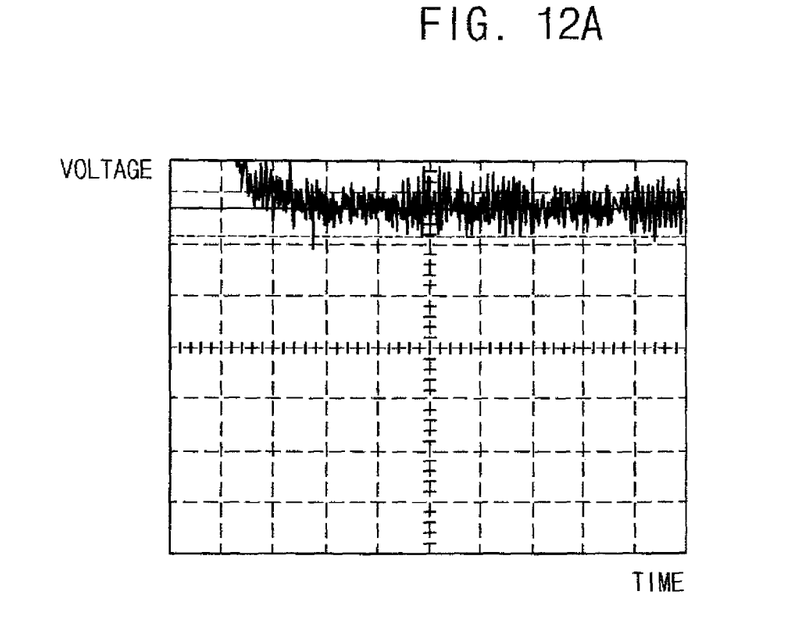
FIGS. 12A, 12B, 12C and 12D are voltage-time graphs obtained from an LCD apparatus described in connection with FIGS. 6 to 8.
Figure 12B:
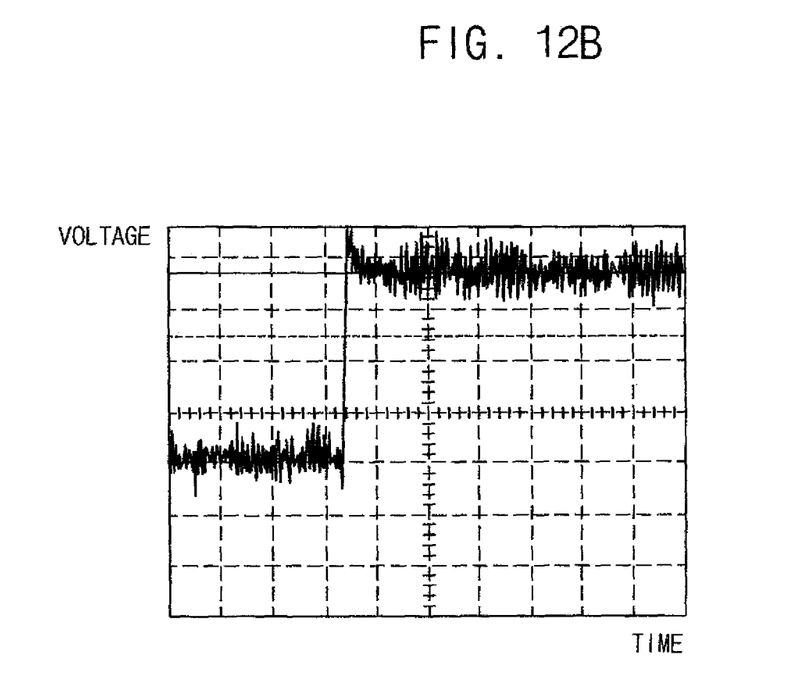
Figure 12C:
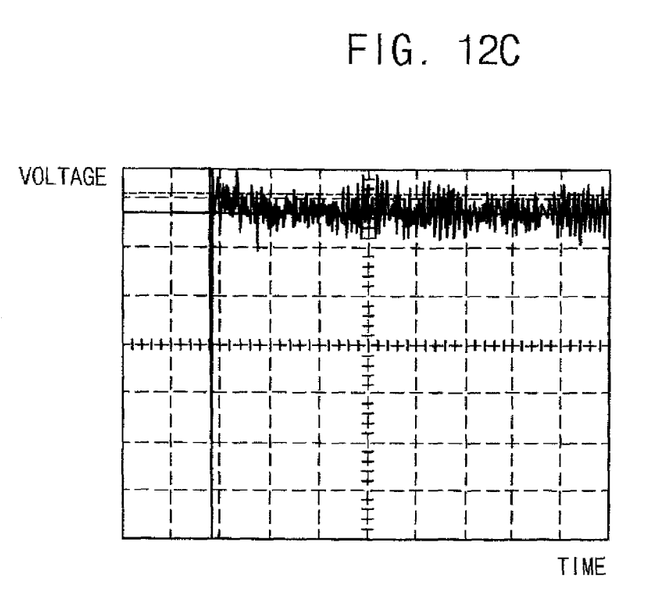
Figure 12D:
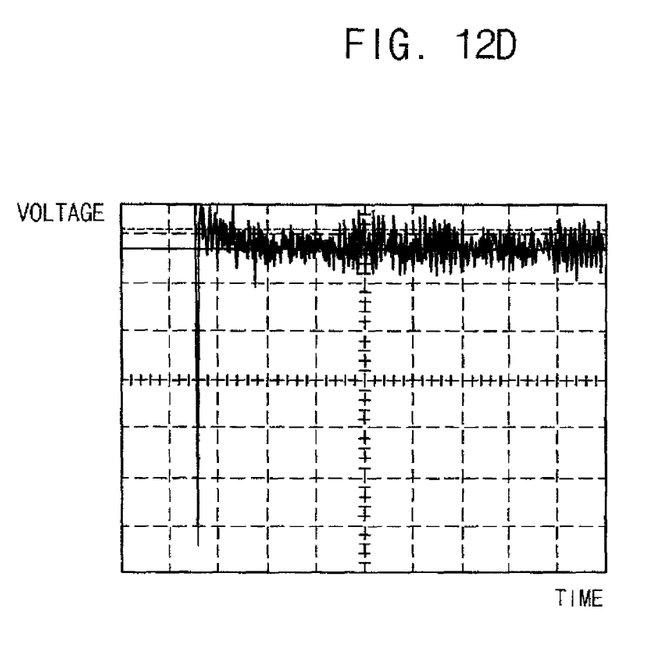

The voltage-time graphs in FIGS. 12A to 12D show test results for the LCD apparatus 400 using voltage-time test equipment such as the BM7 apparatus. FIG. 12A indicates a voltage-time relationship when the grayscale of the displayed image is changed from gray level 0 to gray level 31. FIG. 12B indicates a voltage-time relationship when the grayscale of the displayed image is changed from gray level 15 to gray level 31. FIG. 12C indicates a voltage-time relationship when the grayscale of the displayed image is changed from gray level 47 to gray level 31. FIG. 12D indicates a voltage-time relationship when the grayscale of the displayed image is changed from gray level 63 to gray level 31.

Referring to the voltage-time graphs in FIGS. 12A to 12D, voltage levels are delayed with a time period when grayscale is increased or decreased. For example, substantial delays along the time axis occur during the period between the luminances corresponding to the different grayscales. As such, the response delay occurs when the grayscale is changed.

Thus, the response time and the transmittance in the LCD apparatus 100 may be improved with respect to the LCD apparatus 400.

According to an exemplary embodiment of the present invention, a response time and transmittance in an LCD apparatus may be improved. Thus, the LCD apparatus according to an exemplary embodiment of the present invention may be used for an LCD apparatus including slits for forming a multi-domain structure.

According to an exemplary embodiment of the present invention, liquid crystal molecules adjacent to a boundary area may be effectively controlled, so that textures adjacent to the boundary area may be decreased. Thus, the width of a light-blocking part and a response time may be decreased. As a result, the transmittance of a unit pixel area may be increased, so that the display quality of the LCD apparatus may be increased.

Although exemplary embodiments of the present invention have been described herein with reference to the accompanying drawings, it is to be understood that the present invention should not be limited thereto and that various other changes and modifications may be affected therein by one of ordinary skill in the related art without departing from the scope or spirit of the invention. All such changes and modifications are intended to be included within the scope of the invention.

What is claimed is:

1. A liquid crystal display (LCD) apparatus comprising:
an array substrate including a first substrate, a signal line formed on the first substrate, a switching element connected to the signal line, and a pixel electrode connected to the switching element;
a counter substrate including a second substrate disposed over the array substrate, the counter substrate including a common electrode formed on the second substrate, wherein the common electrode includes a domain division slit dividing a unit pixel area into a plurality of domains, and includes a transmittance improvement slit partially overlapping the pixel electrode and corresponding to a boundary area of adjacent unit pixel areas; and
a liquid crystal layer disposed between the array substrate and the counter substrate, wherein the domain division slit and the transmittance improvement slit are connected to each other in a T-shape.

2. The LCD apparatus of claim 1, wherein the counter substrate further comprises a light-blocking part overlapping the boundary area and the switching element.

3. The LCD apparatus of claim 2, wherein an edge of the light-blocking part is disposed between a first edge of the transmittance improvement slit overlapping the pixel electrode and an edge of the pixel electrode defining the boundary area.

4. The LCD apparatus of claim 3, wherein when an electric field is applied to the liquid crystal layer, an arrangement direction of liquid crystal molecules adjacent to the first edge and an arrangement direction of liquid crystal molecules disposed between the first edge and the edge of the pixel electrode are different from each other.

5. The LCD apparatus of claim 3, wherein the first edge and the edge of the pixel electrode are formed substantially parallel with each other.

6. The LCD apparatus of claim 5, wherein the length of the transmittance improvement slit is shorter than the width of the unit pixel area.

7. The LCD apparatus of claim 5, wherein a second edge of the transmittance improvement slit faces the first edge and is disposed in the boundary area.

8. The LCD apparatus of claim 7, wherein a distance between the second edge and the edge of the pixel electrode is no less than two times and no more than three times a distance between the array substrate and the counter substrate.

9. The LCD apparatus of claim 3, wherein the domain division slit is integrally formed with the transmittance improvement slit.

10. The LCD apparatus of claim 9, wherein the domain division slit extends along an imaginary central line of the unit pixel area substantially parallel with a first direction, and the transmittance improvement slit extends along a second direction substantially perpendicular to the first direction.

11. The LCD apparatus of claim 10, wherein the signal line comprises:
a gate line disposed under the domain division slit, extending along the first direction, and connected to a gate electrode of the switching element; and
a data line extending along the second direction and overlapping the transmittance improvement slit in the boundary area, the data line connected to a source electrode of the switching element.

12. The LCD apparatus of claim 11, wherein a width of the light-blocking part is larger than a width of the boundary area.

13. The LCD apparatus of claim 11, wherein the pixel electrode in a first unit pixel area is connected to a drain electrode of the switching element in a second unit pixel area adjacent to the first unit pixel area.

14. The LCD apparatus of claim 13, wherein the pixel electrode is driven by a previous gate driving method.

15. The LCD apparatus of claim 11, wherein embossed notches or engraved notches are formed on the edges of the domain division slit facing each other.

16. A liquid crystal display (LCD) apparatus comprising:
a first substrate including a switching element and a pixel electrode, the pixel electrode electrically connected to the switching element; and
a second substrate disposed over the first substrate, the second substrate including a common electrode having a first slit and a second slit, wherein the first slit divides a unit pixel area into a plurality of domains, and the second slit partially overlaps the pixel electrode and is disposed to correspond to a boundary area of adjacent unit pixel areas, wherein the first slit and the second slit are connected to each other in a T-shape.

17. The LCD apparatus of claim 16, wherein a length of the second slit is shorter than a width of the unit pixel area.

18. The LCD apparatus of claim 16, wherein the first slit is integrally formed with the second slit.

* * * * *